Patented Dec. 7, 1943

2,336,067

UNITED STATES PATENT OFFICE 2,336,067

PREPARATION OF BETA-ALANINE

Gustaf H. Carlson, Pearl River, N. Y., assignor to Lederle Laboratories, Inc., New York, N. Y., a corporation of Delaware No Drawing. Application June 25, 1942, Serial No. 448,492

9 Claims. (Cl. 260—534)

This invention relates to the preparation of beta-aminopropionic acid (beta-alanine) and more particularly, to the preparation of beta-aminopropionic acid in one step from beta-aminopropionitrile and ammonium hydroxide.

In the past attempts have been made to prepare beta-aminopropionic acid by hydrolysis of the corresponding aminonitrile but none of these has been satisfactory. When the hydrolysis is carried out in the presence of an alkali or alkaline earth metal hydroxide, the corresponding salt of beta-aminopropionic is obtained. Tedius and involved methods are required for isolating these salts and when they have been isolated, an additional step is necessary to convert the salt to the free acid. To avoid this salt formation, acid hydrolysis has been tried but here again difficulty in isolation and purification is encountered. For example, when hydrochloric acid is employed as the hydrolyzing agent, ammonium chloride is produced and it is difficult to separate this impurity from the beta-aminopropionic acid.

According to the present invention, I have found that beta-aminopropionitrile and ammonium hydroxide, when heated together under pressure at temperatures ranging from about 180° C. to about 225° C. for from about one to about twenty-four hours, react to produce beta-aminopropionic acid directly. If desired, a small amount of a corrosion and oxidation inhibitor, such as for example diphenylamine, may be added to the reaction mixture.

Beta-aminopropionic acid has recently become an important intermediate in the preparation of pantothenic acid and accordingly, a commercially practicable method of preparing this intermediate is indicated. The process of the present invention provides such a method.

It is an advantage of the present invention that the only reactants essential for the operation of the process are beta-aminopropionitrile and ammonium hydroxide. The latter is, of course, readily available and cheap; the former is readily available and not disproportionately expensive since it may be obtained by treating acrylonitrile with ammonia according to the following reaction:

It is another advantage of the present invention that the reaction involved is simple, easily controlled, and takes place in a single step. Thus, beta-aminopropionic acid may be produced directly from beta-aminopropionitrile without requiring the isolation of any intermediate product.

It is a further advantage of the invention that the beta-aminopropionic acid is obtained in good yield in a form which permits easy separation from the reaction mixture.

The invention will be described in greater detail in conjunction with the following specific examples. It should be understood that these examples are merely specific embodiments of the invention and it is not intended to limit the scope of the invention to the specific details therein set forth. Parts are by weight unless otherwise stated.

Example 1

12.6 parts (0.18 mol) of beta-aminopropionitrile, 40.5 parts of 28% ammonium hydroxide, 7.3 parts of water and 0.2 part of diphenylamine were heated in an autoclave for four hours at 200° C. The resulting solution was filtered, treated with decolorizing carbon at about 70° C., again filtered, and the filtrate evaporated to a thick, syrupy consistency. The residue was then dissolved in methanol whereupon 3.2 parts of beta-aminopropionic acid suitable for the production of pantothenic acid without further purification crystallized out. Yield: 20%.

Example 2

After recovery of the beta-aminopropionic acid as described in Example 1, the filtrate was evaporated to reclaim the methanol. The resulting syrupy residue was heated with an additional amount of ammonium hydroxide at 200° C. for four hours and the solution treated as described in Example 1. A similar further yield of beta-aminopropionic acid crystals was obtained.

Apparently an equilibrium is reached in the reaction between beta-aminonitrile and ammonium hydroxide which may account for the fact that the residue from one operation may be used as the reactant in another with no appreciable decrease in the yield of beta-aminopropionic acid obtained. When over-all yields are considered, this feature of my process is extremely important since yields approaching the theoretical may be obtained by re-working the residues.

Further evidence for the existence of an equilibrium mixture was obtained from a series of further reactions wherein concentrations of the reactants, time of heating and temperature were varied within wide limits. The strength of the ammonium hydroxide was varied from 2% to 28% with similar variations in the proportion of beta-aminopropionitrile based on the proportion of ammonia; the time of heating, from one to twenty-four hours; and the temperature, from 150° to 250° C. In all cases beta-aminopropionic acid was obtained but only drastic changes in the concentration of reactants gave more than a 35% yield. For example, very low concentrations of beta-aminopropionitrile produced beta-aminopropionic acid in yields of the order of 50%–60% but the increased cost of removing the larger volumes of solvent present would probably neutralize the economical advantages resulting from the increased yields.

The beta-aminopropionic acid produced by my process may, if desired, be converted to an acid salt such as the hydrochloride or to a salt of a metal such as an alkali or alkaline earth metal, and isolated in this form. I prefer, however, to isolate the beta-aminopropionic acid directly from the concentrated syrupy reaction product by diluting it with absolute methanol. When so isolated, the beta-aminopropionic acid is in a pure form and may then, if desired, be converted to the salts when they are required as intermediates in processes for producing pantothenic acid.

Methanol appears to be peculiarly suited for the above isolation or crystallization step. Attempts to dilute with various other aliphatic alcohols such as ethanol or propanol have been unsatisfactory.

In the reaction between beta-aminopropionitrile and ammonium hydroxide under the conditions described above, it may be desirable in some instances to add other substances to the reaction mixture. For example, dehydration catalysts, ammonium salts of weak acids such as ammonium carbonate, inhibitors, anti-oxidants, and other suitable reagents for slightly altering the course or speed of the reaction may be added.

I claim:

1. The process of producing beta-aminopropionic acid which comprises reacting beta-aminopropionitrile with aqueous ammonia at an elevated temperature.

2. The process of producing beta-aminopropionic acid which comprises reacting beta-aminopropionitrile with aqueous ammonia at a temperature of from about 180° C. to about 225° C.

3. The process of producing beta-aminopropionic acid which comprises heating beta-aminopropionitrile and aqueous ammonia at a temperature of about 200° C. for from about one to about twenty-four hours.

4. The process of producing beta-aminopropionic acid which comprises heating beta-aminopropionitrile and aqueous ammonia at a temperature of about 200° C. for about four hours.

5. The process of producing beta-aminopropionic acid which comprises reacting beta-aminopropionitrile with aqueous ammonia at a temperature of from about 180° C. to about 225° C. for from about one to about twenty-four hours, concentrating the reaction mixture to a syrup, and diluting the syrup with methanol to cause precipitation of beta-aminopropionic acid.

6. The process of producing beta-aminopropionic acid which comprises reacting beta-aminopropionitrile with aqueous ammonia at a temperature of about 200° C. for about four hours, concentrating the reaction mixture to a syrup, and diluting the syrup with methanol to cause precipitation of beta-aminoproprionic acid.

7. The process according to claim 1 in which the residue produced by reacting beta-aminopropionitrile with aqueous ammonia is reacted with a fresh quantity of aqueous ammonia at an elevated temperature to produce a further quantity of beta-aminopropionic acid.

8. The process of producing beta-aminopropionic acid which comprises reacting beta-aminopropionitrile with aqueous ammonia at a temperature of from about 180° C. to about 225° C. for from about one to about twenty-four hours, concentrating the reaction mixture to a syrup, diluting the syrup with methanol, collecting the precipitated beta-aminopropionic acid, concentrating the residue, and reacting said residue with aqueous ammonia at a temperature of from about 180° C. to about 225° C. for from about one to about twenty-four hours to produce a further quantity of beta-aminopropionic acid.

9. The process of producing beta-aminopropionic acid which comprises heating at a temperature of about 200° C. a mixture of beta-aminopropionitrile and aqueous ammonia for about four hours, concentrating the reaction mixture to a syrup, diluting the syrup with methanol, collecting the precipitated beta-aminopropionic acid, concentrating the residue, and reacting said residue with aqueous ammonia at about 200° C. for about four hours to produce a further quantity of beta-aminopropionic acid.

GUSTAF H. CARLSON.